Patented Nov. 19, 1946

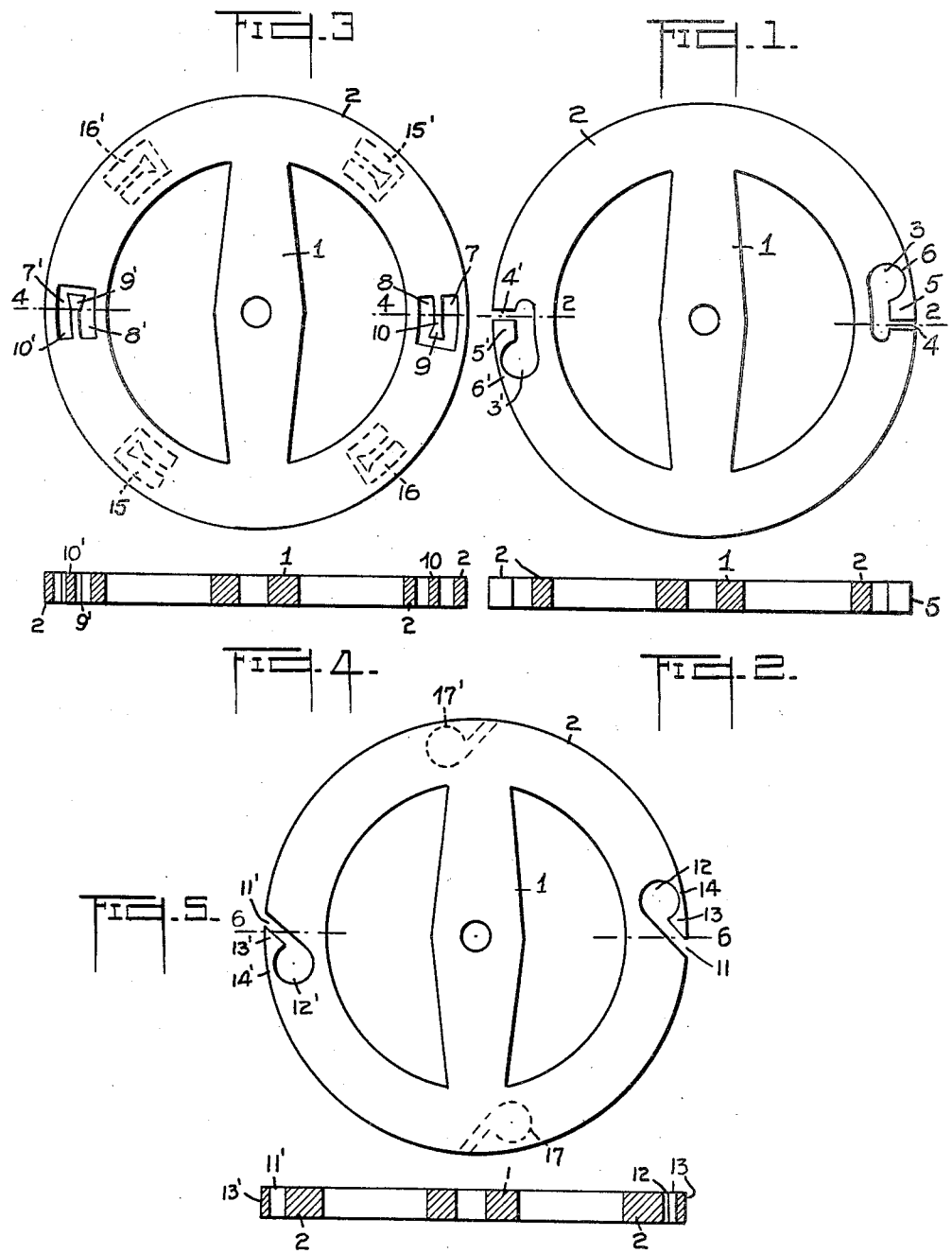

2,411,444

UNITED STATES PATENT OFFICE 2,411,444

BALANCE WHEEL

Marcel Maistre, Neuchatel, Switzerland

Application July 10, 1943, Serial No. 494,159½
In Switzerland July 13, 1942

1 Claim. (Cl. 58—107)

The present invention relates to a new and improved process for producing balance wheels for clocks and watches.

The object of the invention is to produce a balance wheel with efficient means to vary its arc of movement.

The new process consists in that the rim of the balance wheel is provided with at least one notch or incision in such a manner that a fragment of the body of the balance is partly detached therefrom and is connected with said wheel body by a comparatively narrow portion which may be easily deformed by some appropriate tool but not by the action of the centrifugal force.

The invention relates moreover to an oscillating balance produced in the manner aforesaid.

In the accompanying drawing the new balance wheel made according to the new process is shown in a diagrammatical manner in three modifications.

Fig. 1 shows a balance wheel in a plan view.

Fig. 2 is a section taken on line 2—2 of Fig. 1.

Fig. 3 is a plan view of another balance wheel of which

Fig. 4 is a section taken on line 4—4 of Fig. 3.

Fig. 5 shows a third example of the balance wheel in a plan view and in

Fig. 6 is a section taken on line 6—6 of Fig. 5.

The rim 2 of the balance wheel 1 (Figs. 1 and 2) is provided with two incisions arranged symmetrically to the center line 2—2 and at equal radial distance.

Each incision comprises a radially directed slot 4, 4¹ and an enlarged part 3, 3¹ respectively running substantially at a right angle to slot 4, 4¹. By these incisions fragments 5, 5¹ are partly detached from the body of the balance wheel 1. Owing to the particular shape of the enlargements 3, 3¹ of the incisions a comparatively narrow bridging part 6 resp. 6¹ is produced. These parts 6, 6¹ allow an easy bending of the fragments 5, 5¹ by an appropriate tool for instance a pair of pincers but they are strong enough to not allow a displacement of the fragments 5, 5¹ by the action of centrifugal force. By radial displacing the fragments 5, 5¹ the arc of movement and therewith the action of the balance wheel may be very exactly regulated with little labor.

In Figs. 3 and 4 a balance wheel 1 is shown having two incisions 7 in the rim 2, they are arranged symmetrically to a center line 4—4. In each incision 7, there is a tongue 10, 10¹ having an enlarged head 9, 9¹ and a narrow part 8, 8¹ by which it is connected with the body of rim 2. These tongues 10, 10¹ may be easily displaced in radial direction correcting thereby the arc of movement of the balance wheel. As shown in broken lines two pairs of incisions 15, 15¹ and 16, 16¹ may be added. The action of the balance wheel may be corrected thereby within very wide limits.

As shown in Figs. 5 and 6 the shape of the incision may be modified. Round holes 12, 12¹ are worked out in the rim 2 of the balance wheel 1 and from each hole a cut 11, 11¹ runs to the outer edge of the rim 2. The fragments 13, 13¹ are connected by the bridging parts 14, 14¹ with the body of the rim 2. By bending the parts 14, 14¹ the radial position of the fragments 13, 13¹ may be altered but only by means of tools and not by centrifugal force during the run of the watch.

A balance wheel made according to this invention allows an easy accurate and speedy adjustment.

What I wish to secure by United States Letters Patent is:

A balance wheel for clocks and watches comprising a metal rim of uniform radial width and spokes integral with and consisting of the same metal as said rim, a fragment of said rim being partly detached from the body thereof by an incision in the latter, said fragment being connected with said body by a deformable narrow bridge portion of sufficient mechanical strength to prevent displacement of said fragment relative to said body under the action of the centrifugal force operating upon the balance wheel, but permitting forcible radial displacements of said fragment for the purpose of regulating the arc of movement of the balance wheel.

MARCEL MAISTRE.